US008862981B2

(12) United States Patent  (10) Patent No.: US 8,862,981 B2
Margitich et al.  (45) Date of Patent: Oct. 14, 2014

(54) EMAIL FORMS ENGINE FOR PORTABLE DEVICES

(75) Inventors: Michael S. Margitich, New York, NY (US); Adam J. Halpern, New York, NY (US); Igor Dekhtyar, Brooklyn, NY (US)

(73) Assignee: Barclays Capital Inc., New York, NY (US)

( * ) Notice: Subject to any disclaimer, the term of this patent is extended or adjusted under 35 U.S.C. 154(b) by 605 days.

(21) Appl. No.: 11/889,851

(22) Filed: Aug. 16, 2007

(65) Prior Publication Data

US 2008/0046807 A1  Feb. 21, 2008

Related U.S. Application Data

(60) Provisional application No. 60/838,658, filed on Aug. 18, 2006.

(51) Int. Cl.
  *G06F 3/00* (2006.01)
  *G06F 17/00* (2006.01)
  *H04L 12/58* (2006.01)
  *G06Q 10/10* (2012.01)

(52) U.S. Cl.
  CPC .............. *G06Q 10/107* (2013.01); *H04L 51/18* (2013.01); *H04L 51/08* (2013.01); *H04L 51/38* (2013.01)
  USPC ............ 715/221; 715/234; 715/744; 715/752

(58) Field of Classification Search
  CPC . H04L 51/066; G06F 17/3089; G06F 9/4843; G06F 9/45529; G06Q 10/107
  USPC ......... 715/221–226, 229, 234–242, 744, 751, 715/752, 760
  See application file for complete search history.

(56) References Cited

U.S. PATENT DOCUMENTS 5,793,972 A * 8/1998 Shane ........................... 709/219
6,014,688 A * 1/2000 Venkatraman et al. ....... 709/206
6,332,156 B1  12/2001 Cho et al.
6,704,771 B1 * 3/2004 Gough .......................... 709/206

(Continued)

FOREIGN PATENT DOCUMENTS

JP  2000267952  9/2000
JP  2003099364  4/2003
JP  2005056255  3/2005

OTHER PUBLICATIONS

Blackberry Java Development Environment, [online], Blackberry, [retrieved on Aug. 16, 2006] Retrieved from the Internet < URL: http://www.blackberry.com/developers/downloads/jde/index.shtml>.
International Preliminary Report on Patentability for PCT/US2007/018186 dated Feb. 24, 2009, 6 pages.

(Continued)

*Primary Examiner* — Omar Abdul-Ali
*Assistant Examiner* — Andrew Tank
(74) *Attorney, Agent, or Firm* — Morgan Lewis & Bockius LLP (57) ABSTRACT

A system includes a database, and a server, the server including a messaging module to generate one or more email messages, one or more of the one or more email messages each having attached thereto a form script file, and to send the one or more email messages over a communications network to a portable device, the one or more form script files including definitions of a form interface to be used by the portable device to render the form interface.

29 Claims, 6 Drawing Sheets

(56) References Cited

U.S. PATENT DOCUMENTS

| | | | |
|---|---|---|---|
| 7,925,682 B2* | 4/2011 | Moore et al. | 707/831 |
| 2002/0059144 A1* | 5/2002 | Meffert et al. | 705/51 |
| 2002/0103737 A1* | 8/2002 | Briere | 705/36 |
| 2002/0129096 A1 | 9/2002 | Mansour et al. | |
| 2003/0126136 A1 | 7/2003 | Omoigui | |
| 2003/0163531 A1 | 8/2003 | Nakajima | |
| 2005/0193380 A1 | 9/2005 | Vitanov et al. | |
| 2005/0210263 A1* | 9/2005 | Levas et al. | 713/182 |
| 2006/0036941 A1 | 2/2006 | Neil | |
| 2006/0095510 A1 | 5/2006 | Rouse et al. | |
| 2006/0161646 A1* | 7/2006 | Chene et al. | 709/223 |
| 2007/0150521 A1* | 6/2007 | Vedula | 707/200 |
| 2007/0220097 A1* | 9/2007 | Silver et al. | 709/206 |
| 2007/0233794 A1* | 10/2007 | Singh | 709/206 |
| 2013/0080870 A1* | 3/2013 | Jacobs | 715/224 |

OTHER PUBLICATIONS

International Search Report for PCT/US2007/018186 dated Mar. 7, 2008, 2 pages.
Written Opinion for PCT/US2007/018186 dated Mar. 7, 2008, 6 pages.
Publication for PCT/US2007/018186 dated Feb. 28, 2008, 28 pages.
European Search Report for European Patent Application No. 07836930.3 dated Dec. 10, 2010.
1st Office Action for European Patent Application No. 07836930.3 dated Jul. 11, 2011, 5 pages.
1st Office Action for Japanese Patent Application No. 2009524685 dated Jan. 4, 2012, 8 pages.
Japanese Patent Application No. 2009-524685, Decision of Rejection, dated Jun. 19, 2012, 4 pages.
Japanese Patent Application No. 2009-524685, Official Inquiry, dated Jun. 4, 2013, 9 pages.

* cited by examiner

FIG. 1

```
<?xml version="1.0" encoding="UTF-8"?>
<screen>
<environment value="QA"/>
<title value="Meeting Synopsis"/>
<emailInfo address= "returnemail@returnemail.com"   ' name="eBankerQA Mobile"/>
<form>
<collection>
<field type="text" editable="no" label="Subject:" value="Test BB meeting form"/>
<field type="separator"/>
<field type="text" editable="yes" label="Comments:" value="" name="comments"/>
<field type="separator"/>
<field type="label" value="Lehman Attendees:"/>
<field type="check" editable="yes" label="Igor Dekhtyar" value="9474" name="Lehman" checked="yes"/>
<field type="hidden" name="meetingId" value="11000056125"/>
<field type="hidden" name="formInstanceKey" value="UO60001792006"/>
<field type="hidden" name="formCode" value="SYNOP"/>
</collection>
</form>
</screen>
```

EMAIL FORMS ENGINE FOR PORTABLE DEVICES

This application claims the benefit of the U.S. Provisional Patent Application No. 60/838,658 filed on Aug. 18, 2006, which is hereby incorporated by reference.

BACKGROUND OF THE INVENTION

1. Field of the Invention

The present invention relates to portable device technology, and more particularly to collection and organization of data from portable devices.

2. Discussion of the Related Art

Due to the highly mobile nature of the current society, many people find themselves performing tasks on the road that were normally done at a desk. From a technology standpoint, capabilities of communication and computing tools available at a desk far exceeds those used on the road due to portability and power consumption issues. For instance, computers available in the office are extremely powerful and fast, providing multitasking abilities with applications that require large amounts of processing power. These computers have large amount of data storage and memory capabilities with processors that are able to process large amount of data. However, for devices that are designed to be used outside of the office have performance limitations due to their portability. While many computers have been shrinking in size to accommodate mobile users, these portable computers (e.g., laptops, notebooks, tablets, etc.) are still relatively cumbersome to use, especially in tight spaces or while moving. Accordingly, electronic mail ("e-mail") enabled handheld devices are tools of choice for a majority of mobile users to stay connected to the office during travel.

A limitation of email-enabled portable devices, such as a personal digital assistant ("PDA"), is that because of the limited amount of memory and processing power of the portable device, full email capability available on computers are not available on the portable device. For example, many email-enabled portable devices cannot access attachments to emails (e.g., an electronic document) because the portable device does not have the resources to store and run the application needed to access the attachments. Accordingly, email-enabled portable devices generally have the bare minimum email capabilities (i.e., text and basic graphics rendering).

Due to the basic nature of email capabilities on these portable devices, dissemination and collection of data from these portable devices become cumbersome. For example, if information is needed from a mobile user, a user requesting the information will preparing a message in an email detailing the information that needs to be collected from the mobile user. The mobile user who receives this message will have to parse through all the text to determine how to respond. The mobile user will then have to generate a new email message with the requested data provided in the new message in a way so as to allow the requester to be able to discern what the message is conveying.

Generally, such request for information and response can be handled efficiently with a form. A form may be generated with the requested data explained in each field and sent to the user. The requested information may then be input directly into the fields of the form and sent back to the requester, thereby simplifying the dissemination and collection process. Unfortunately, many email-enabled portable devices lack the capability of supporting such forms from being disseminated and collected for the reasons discussed above.

SUMMARY OF THE INVENTION

Accordingly, the present invention is directed to a system and method for requesting and collecting data through email-enabled portable devices that substantially obviates one or more problems due to limitations and disadvantages of the related art.

In general, the system and method in accordance with the present invention sends data request emails to email-enabled portable devices. The data request emails include a script file attachment that directs the portable device to customize the standard user interface ("UI") to display the data request message in a "form" format. The portable device then generates the form on the fly and displays the data request message to the user. After the user inputs the information into the form, the portable device converts the inputs into a normal text-based email message in a format that can be parsed and processed by a backend system. The converted email message is then emailed back to a specified email address designated in the form. Upon receipt of the converted email, the designated backend system processes the email message to obtain the data requested. Because the forms are created on the fly from a script file attached to the email and the responses are converted into a normal text-based email message, any email-enabled portable device may be used to request and collect data from a user in a simple and convenient manner.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the system includes a database, and a server, the server including a messaging module to generate one or more email messages, one or more of the one or more email messages each having attached thereto a form script file, and to send the one or more email messages over a communications network to a portable device, the one or more form script files including definitions of a form interface to be used by the portable device to render the form interface.

In another aspect, the method includes the steps of creating a form script file including definitions of a form interface to be used by a portable device to render the form interface, creating a record in a database for the form script file, attaching the form script file to an email message, and transmitting the email message to the portable device through a communications network.

In yet another aspect, the portable device includes a display, an email application module, an interface module to render an email interface on the display, and a forms engine to detect an email message received by the email application unit containing a form script file, and to cause the interface module to render a form interface based on the form script file, the form script file including definitions of the form interface.

In still yet another aspect, the method includes the steps of receiving an email message with an attachment, determining if the attachment is a form script file, if the attachment is not a form script file, then processing the email message as a regular email message, and if the attachment is a form script file, then processing the form script file to render a form interface, the form script file including definitions of the form interface.

In another aspect, the computer program product includes a computer readable medium having stored thereon computer executable instructions that, when executed by a computer, direct the computer to perform a method comprising the steps of creating a form script file including definitions of a form interface to be used by a portable device to render the form interface, creating a record in a database for the form script file, attaching the form script file to an email message, and transmitting the email message to the portable device through a communications network.

In yet another aspect, the computer program product includes a computer readable medium having stored thereon computer executable instructions that, when executed by a computer, direct the computer to perform a method comprising the steps of receiving an email message with an attachment, determining if the attachment is a form script file, if the attachment is not a form script file, then processing the email message as a regular email message, and if the attachment is a form script file, then processing the form script file to render a form interface, the form script file including definitions of the form interface.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
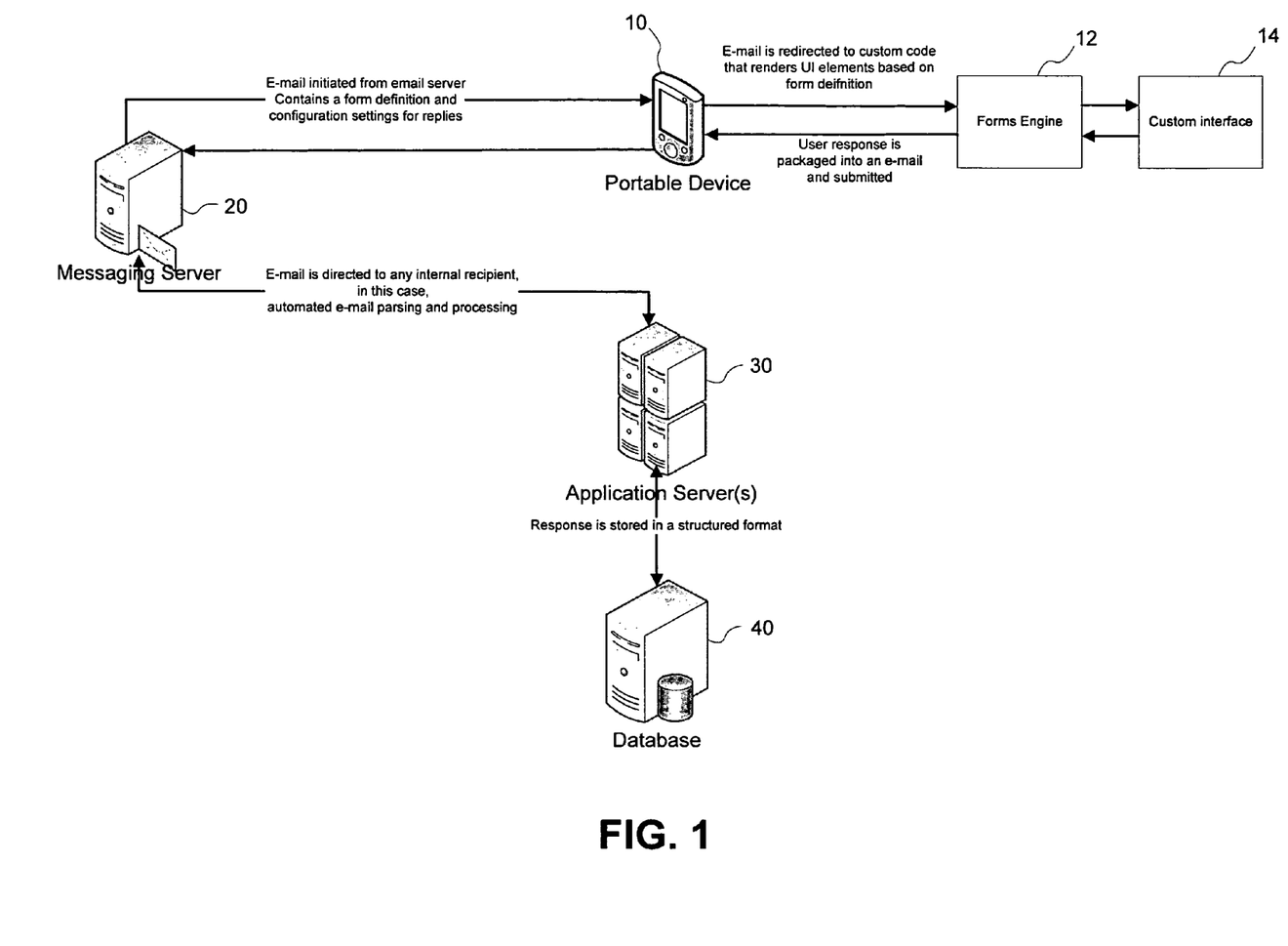
FIG. 1 is a block diagram illustrating an exemplary embodiment of the present invention.

As shown in FIG. 1, a data collecting system in accordance with the present invention includes an email-enabled portable device 10, a messaging server 20, an application server 30, and a database 40. In general, the messaging server 20 detects an email-generating event (e.g., a new meeting, banking lead, a new survey, etc.) on the application server 30. In response, the messaging server 20 generates a generic email message with a device-specific script file attachment (i.e., a data request email). The script file may be of any text-based scripting language, such as Extensible Markup Language ("XML"), for example. Other scripting language may be used without departing from the scope of the invention.

Once the data request email has been generated, the messaging server 20 sends the email to the portable device 10. The portable device 10 may be any email-enabled portable device, such as a cell phone, a personal digital assistant ("PDA"), a palmtop computer, and the like. When the user opens any email, a forms engine 12 is invoked through a callback interface on the portable device 10. The forms engine 12 checks the attachment of the opened email to determine if it is a special script file. When the script file is detected, the forms engine 12 displays the data request message in a form format as defined in the script file. In order words, the forms engine 12 renders a customized form on the fly based on the script file definitions and displays the data request as a customized interface 14. The user then inputs the requested information in the customized interface 14 and submits the form. Upon submission, the form engine 12 converts the input information into a normal text-based email message and sends the information back as a reply email to an email address specified in the script file.

When the messaging server 20 receives the reply email from the portable device 10, the message is automatically parsed and processed to retrieve the data needed by the application in the application server 30 that triggered the email-generating event. The response is then stored in a structured format in the database 40. A more detailed description of each of the components is provided below.

In general, the system and method of the present invention involves three components. The first component is directed to the data request email generation (i.e., "Outgoing"). The second component is directed to the processing of the data request email at the portable device (i.e., "Processing"). The third component is directed to the backend processing of the response email received from the portable device (i.e., "Incoming"). Each of these components is explained in turn.

The Outgoing component involves setting up a new "form," generating the script file for the form, and sending the form script file as an attachment. More specifically, as explained above, the script file is technically not a "form" per se. Rather, the script file directs the portable device to display the information included in the script file in a form format including fields to be populated by the user, as described in more detail below. Accordingly, a forms engine in the portable device generates a form on the fly in accordance with the definitions provided in the form script file attached to the email. In order to be able to properly match the incoming response emails from the users in response to data request emails, the Outgoing component includes creating various entries in the database 40. For instance, a new record is created in a form table (e.g., BBForm table) for each script file created. For each script file-created, i.e., a form, a randomly generated key (e.g., formInstanceKey) is included in the script file to prevent erroneous form submissions. The script file is created using any scripting language (e.g., XML) that defines at least a return email to which the response is to be sent, the unique form ID (i.e., formInstanceKey), and the fields into which the responses from the user are to be entered.

For example, Table 1 shows some of the field types that are definable in the script file:

TABLE 1

| Field Type | Description | Possible Attributes |
| --- | --- | --- |
| text | text field with a label | editable, label, value, name |
| label | regular text lable | value |
| title | bold title | value |
| date | date field | editable, label, value, name, format |
| radio | radio button | editable, label, value, name |
| check | checkbox | editable, label, value, name, checked |
| select | select box - must also contain one or more option elements | editable, label, name |
| option | option element | label, value |
| separator | a horizontal line used for visual section separation | |
| skip | insert a blank line | |

The field types described in Table 1 are only examples of the type of fields that can be defined in the script file and are not meant to be limiting. Accordingly, other field types may be defined without departing from the scope of the present invention.

Table 2 below is an exemplary list of attributes for the field elements.

TABLE 2

| Attribute | Description |
| --- | --- |
| type | (checkbox, text, label, etc.) full list of types is in Table 1 |
| editable | "yes/no" specifies if the field can be changed on the portable device |
| label | defines a textual label for a field |
| name | this is the key part of the key/value pair sent back |
| value | defines the value part of the key/value pair sent back |
| format | applies to date field and defines how the date field will be displayed |
| checked | "yes/no" applies to checkboxes and indicates the initial state |
| selected | "yes/no" applies to radio buttons and indicates the initial state |

Figure 2:
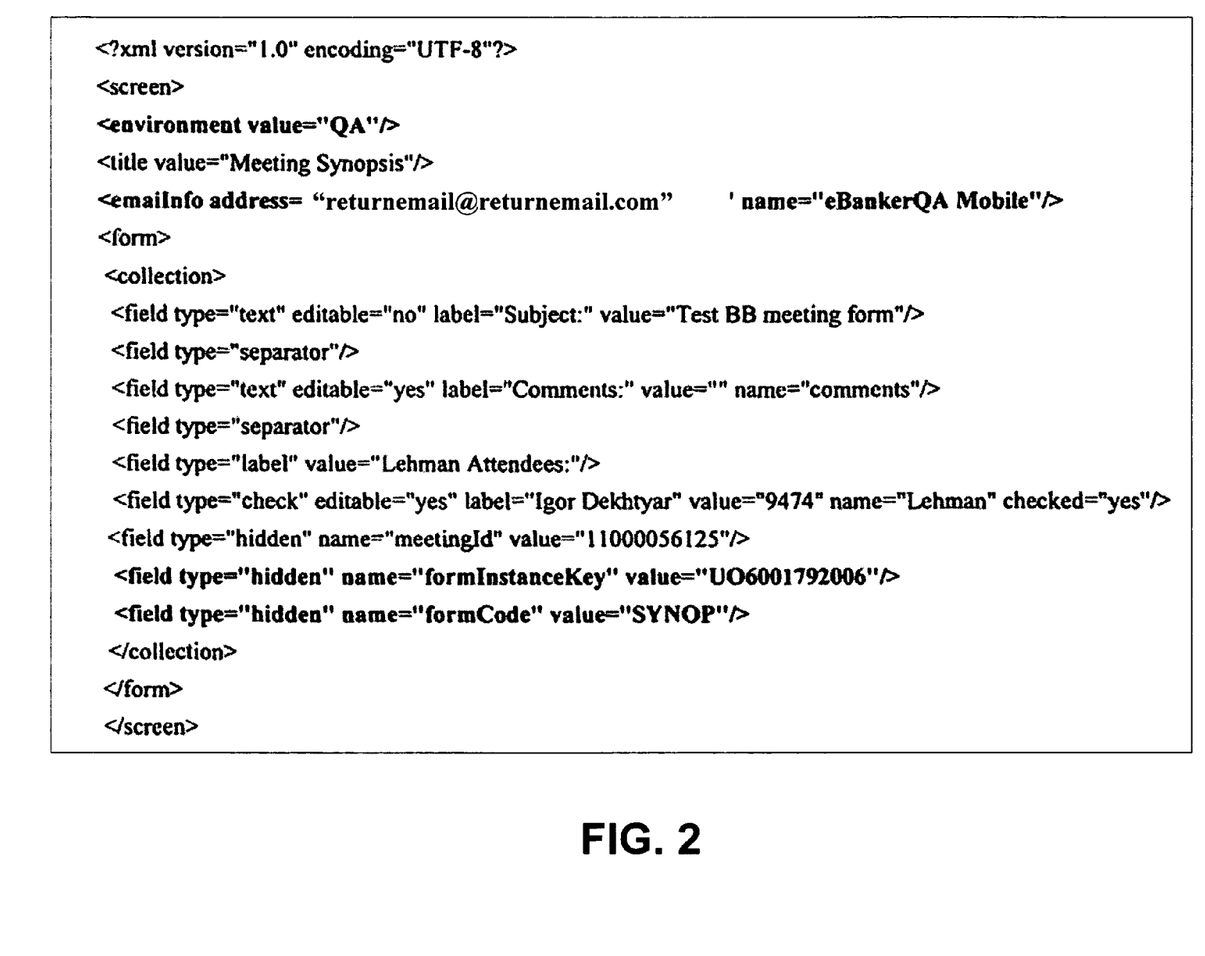
FIG. 2 is an exemplary script file in accordance with the present invention.

As with Table 1, the list in Table 2 is not meant to be an exhaustive list. Other attributes may be defined and used without departing from the scope of the invention. Based on the exemplary field types and attributes described above, FIG. 2 illustrates an example of a script file for a data request for a meeting. Once the script file has been generated, a new record containing the file name of the script file is entered into a table in the database 40 (e.g., GenericEmailDetail table). For example, the value of a record (e.g., GenericEmailDetailType) may be designated as "FN." Then, the script file is inserted into a table (e.g., GenericEmailAttachmentDetail table) in the database 40 using the file name record (e.g., genericEmailDetailId) inserted in the table above. All field elements need to be in the "collection" element. A collection element may have other collection elements specifying the layout attribute. For example, <collection> defines a vertical layout by default (i.e., all fields are placed on a new line). Accordingly, <collection layout="horizontal"> may be used to generates fields that are placed horizontally, or <collection layout="flow"> may be used to place fields horizontally that wraps around to the next line if there is no more space on a line. Once the records have been created in the database 40, the script file is attached to a generic email and sent to the portable device 10.

Figure 3A:
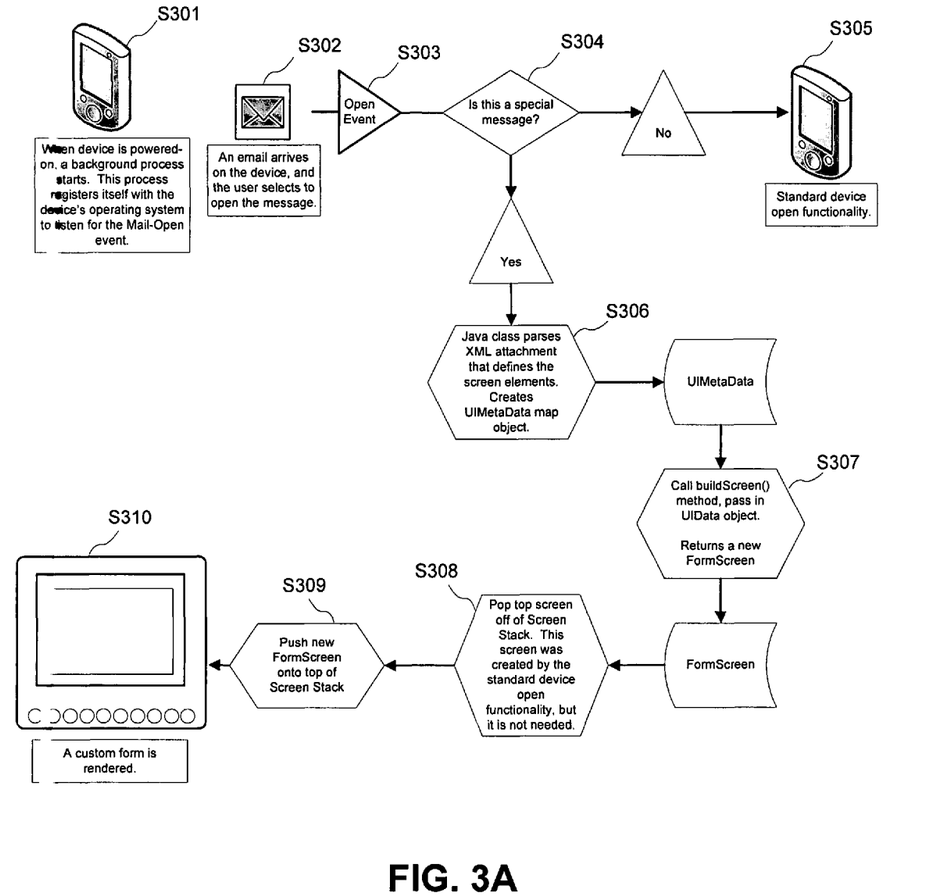
FIG. 3A is a flow diagram illustrating an exemplary embodiment of the present invention.

The Processing component involves two phases of processing at the portable device 10. The details of the processing of the data request email on the portable device 10 are described with reference to FIGS. 3A-3C. As shown in FIG. 3A, when the portable device 10 is first powered on, the forms engine 12 starts as a background process to register with the device's operating system to listen for a "mail-open" event (S301). Once the generic email with the script file attachment (i.e., the data request email) is received by the portable device 10, the data request email appears in the Inbox of the email application of the portable device 10 like any other email entry. The user, then, selects the email to open the message (S302). The opening of the email generates a mail-open event detected by the forms engine 12 (S303). The opened email is analyzed to determine if it is a special message (i.e., form-enabled) by checking if there is an attachment and whether the attachment is a form script file (S304). If not, the message is processed by the device's standard open functionality and rendered on the portable device 10 (S305).

Figure 3B:
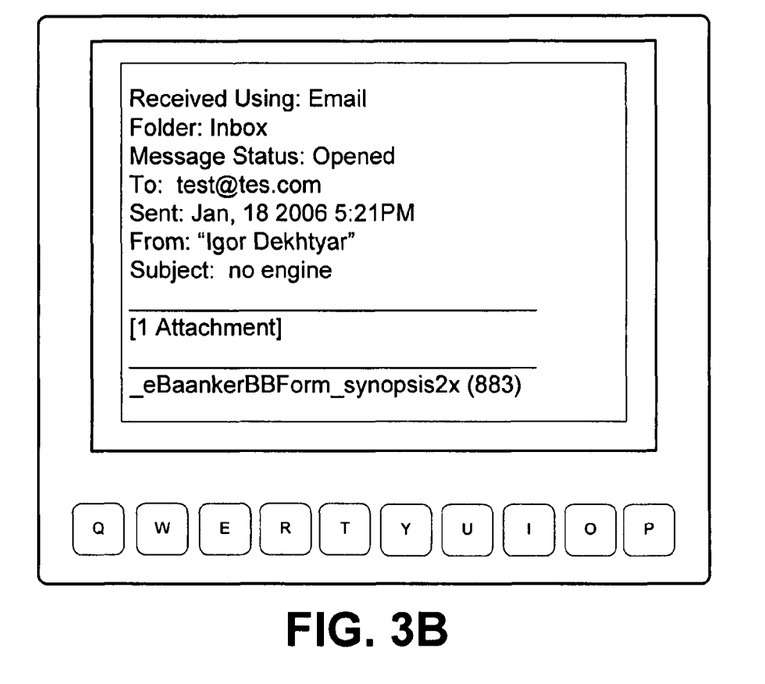
FIG. 3B is an exemplary view of an email displayed on a portable device without a forms engine of the present invention.
Figure 3C:
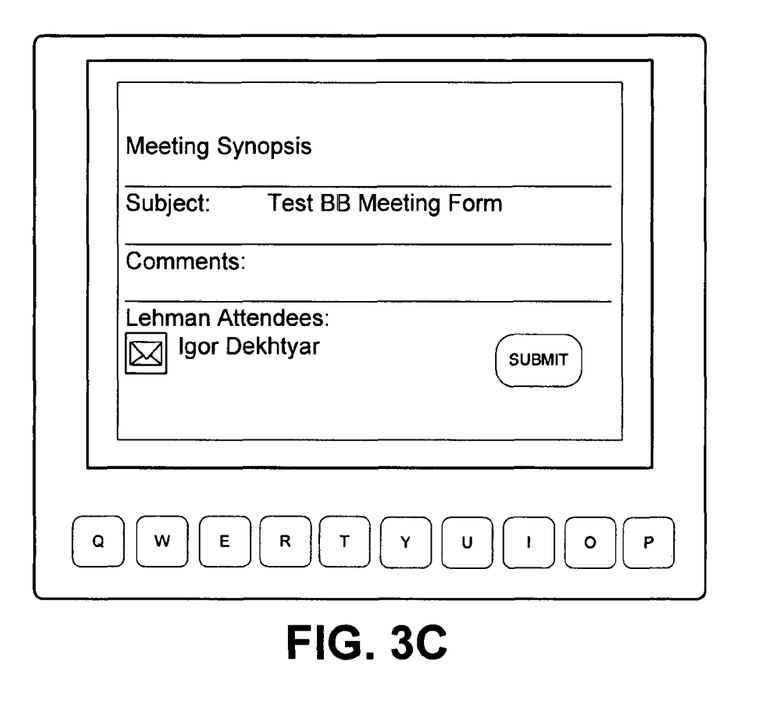
FIG. 3C is an exemplary view of a form-enabled screen generated by the forms engine in accordance with the present invention.

If the email is determined to be a special message (i.e., form-enabled data request), then the forms engine 12 parses through the attached script file that defines the screen elements (e.g., definitions of Tables 1 and 2) and creates a user interface map object (e.g., UIMetaData)(S306). The form engine 12 uses the interface map object to generate on the fly a new screen that displays the defined fields in the script file as a fillable form screen (S307). The form screen object (e.g., FormScreen) has a collect of form field objects, each of which includes a reference to the standard graphic user interface (GUI) control as well as more robust handling of name/value pairs. The form screen object extends the standard screen objects in the portable device's application programming interface (API). The forms engine 12 then pops off the top screen, which was created by the standard device open functionality, from the screen stack as this standard screen is no longer needed (S308). The forms engine 12 then pushes the new form screen onto the top of the screen stack (S309), and the new form-enabled screen (e.g., a fillable, form-enabled data request) is displayed on the portable device 10 (S310). FIG. 3B illustrates an example of how the data request email with the script file attachment is displayed on a typical portable device without a forms engine 12 of the present invention. FIG. 3C illustrates an example of the form-enabled screen displayed on the portable device 10 after being processed by the forms engine 12 as described above.

Figure 4A:
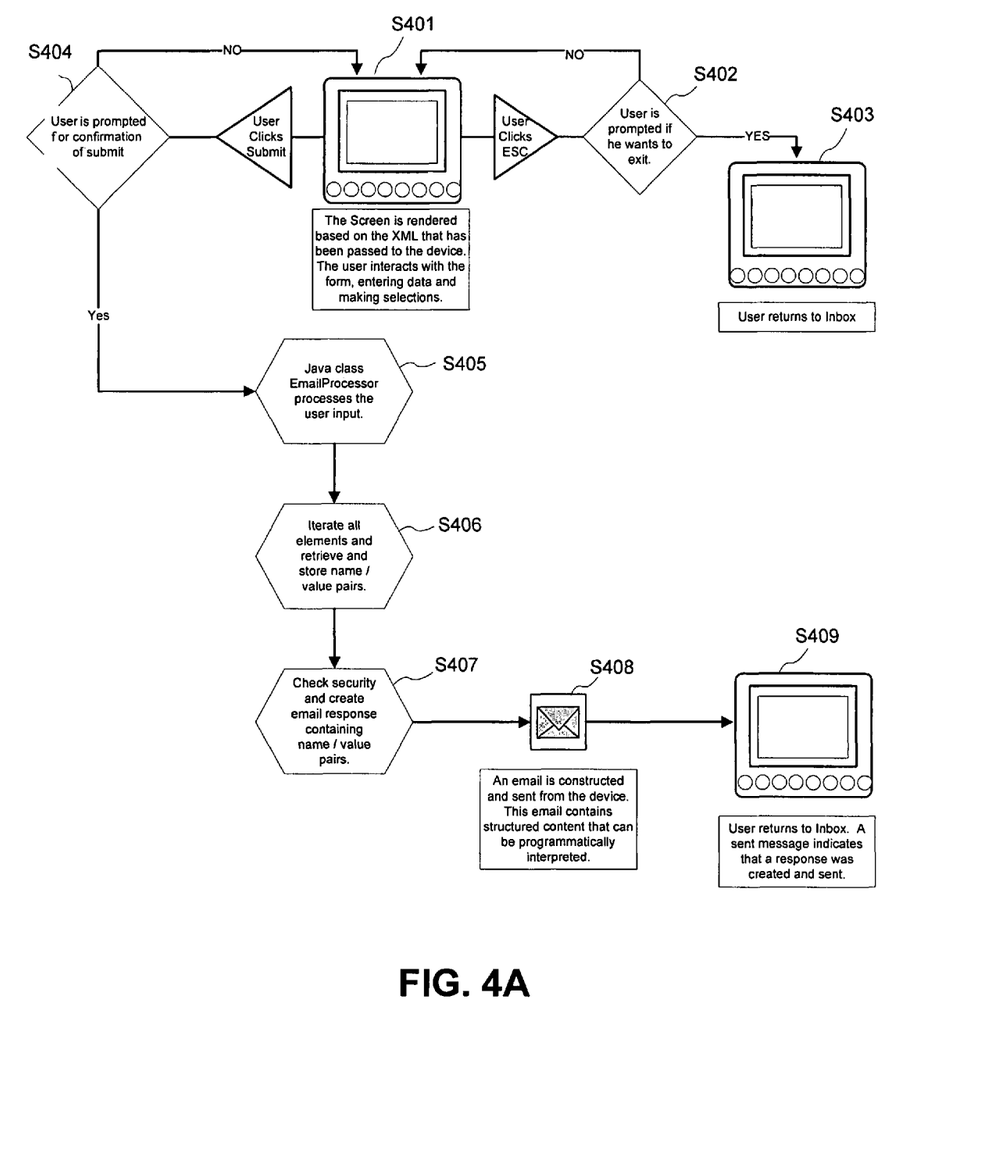
FIG. 4A is a flow diagram illustrating another exemplary embodiment of the present invention.
Figure 4B:
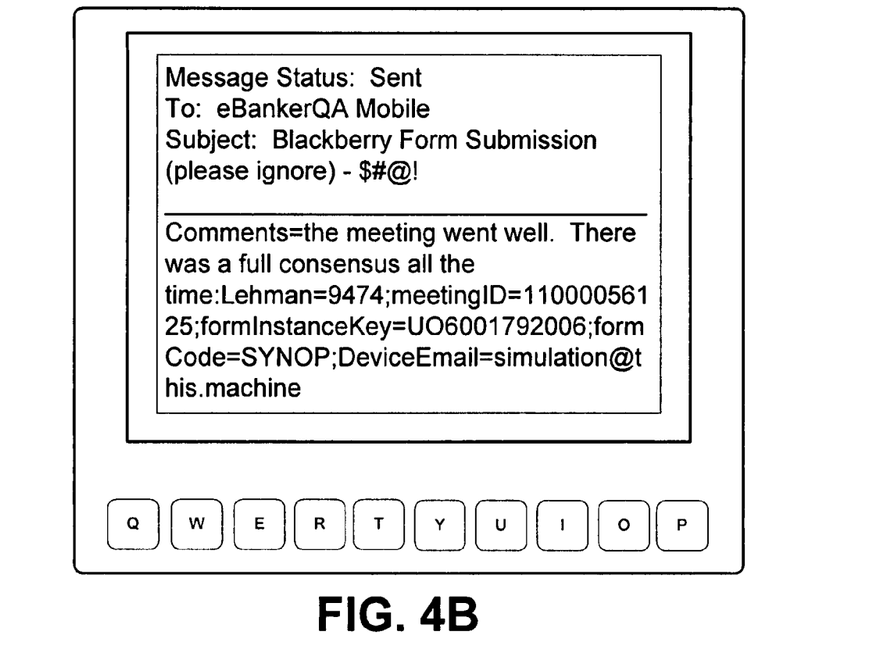
FIG. 4B is an exemplary view of a response email generated by the forms engine in accordance with the present invention.
Figure 4C:
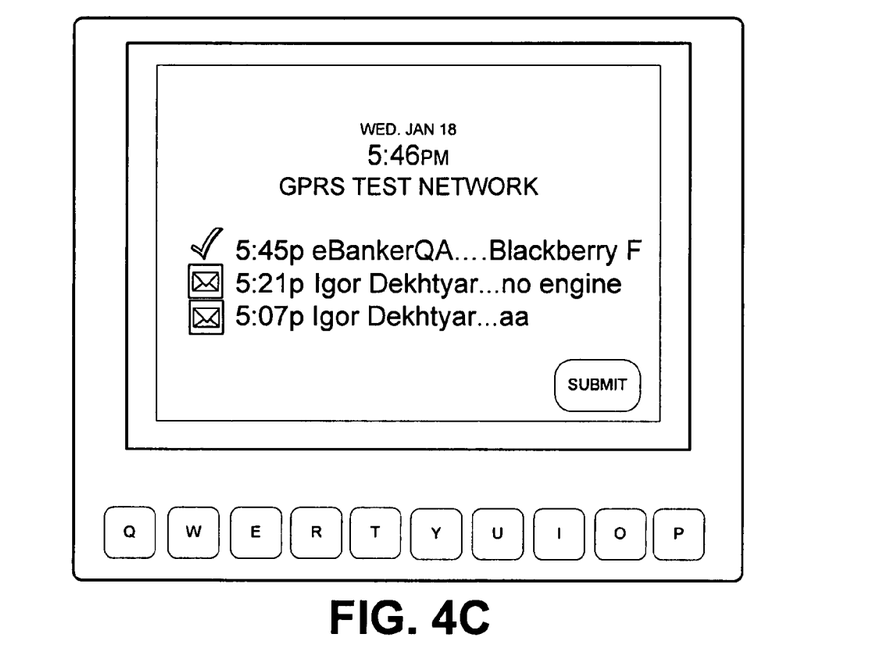
FIG. 4C is an exemplary view of a submission confirmation in accordance with the present invention.

The details of processing a response to the data request email are described with reference to FIGS. 4A-4C. As shown in FIG. 4A, the form-enabled screen is rendered on the portable device 10 based on the attached script file. The user interacts with the fillable, form-enabled screen to input the requested data and making the necessary selections (S401). If the user selects to cancel the entries (e.g., ESC button), the user is prompted to confirm exiting the message (S402). If the user confirms the exit, then the screen returns to the Inbox (S403). If the user cancels the exit, then the screen goes back to the form-enabled screen (S401). If the user selects to submit the entries into the form-enabled screen, the user is prompted to confirm the submission (S404). If the user cancels the submission, the screen goes back to the form-enabled screen (S401). If the user confirms the submission, then the forms engine 12 processes the response for submission.

The forms engine 12 processes the inputs made by the user into the form-enabled screen (S405). These include the inputs made into the fields defined in the script file used to render the form-enabled screen. In particular, the forms engine 12 iterates through all of the field elements and stores the name/value pairs of each entry (S406). The name/value pairs for each entry are validated, for example, by type/boundary checks, to ensure that the value entered into the field is proper (e.g., text in a numeric field), and the collected name/value (i.e., key/value) pairs of the entries are then used to generate a response email that includes all of the name/value pairs detected (S407). The generated response email, which contains the structured content to be programmatically interpreted by the receiving messaging server 20, is sent to the designated messaging server 20 defined by a return email address included in the script file (e.g., FIG. 2: "eBankerQA mobile" server at "returnemail@returnemail.com")(S408). The screen is then returned to the Inbox with a sent message indication in the Inbox to indicate that the response email was sent (S409). FIG. 4B illustrates an example of a response email generated by the forms engine 12 after processing the entries into the form-enabled screen (S407). FIG. 4C illustrates an example of a confirmation in the Inbox that the response email has been sent.

Once the response email has been received, the Incoming component involves parsing through the response email to collect the key/value pairs and extracting the data that identifies the response email to the generated script file (i.e., the formCode and the formInstanceKey). Once the script file identification information has been extracted, a process is called to insert a record into database 40 (e.g., BBFormIncoming table) and verify the validity of the identification information by-checking in the database 40 to see if the same identification information was ever created (e.g., formInstanceKey). If the identification information is valid (i.e., a matching formInstanceKey is found in the database 40), then all of the key/value pairs collected from the response email is inserted into the database 40 (e.g., BBFormParamBuffer). If the key of the key/value pair appears more than once, then one row may be inserted for each time the key appears. If the value of the key/value pair is too large to fit into the database field (i.e., BBFormParamBuffer), it may be chopped into multiple rows. A handler may then call another process to get all the SQL statements. The handler, then, parses each statement, performs the necessary substitutions, and performs the database calls in proper order. Additional error handling and notifications may then be processed.

For example, Table 3 below shows an example of SQL statements that may be executed to process the response email described above.

TABLE 3

| BBFormSQLId | BBFormID | SQL | type | sortOrder |
|---|---|---|---|---|
| 1 | 1 | SELECT postMeetingNotes FROM cmgMeeting WHERE meetingID={meetingID} and validStatusID=1 | select | 1 |
| 2 | 1 | UPDATE cmgMeeting SET lastUpdatedDate=getDate( ), lastUpdatedUserID={personId}, postMeetingNotes={"comments+nl+nl+ postMeetingNotes"}, lastEmailRaw=null WHERE meetingId={meetingId} | update | 2 |
| 3 | | bb_setCmgOmfUpdateAttended | proc | 3 |

These statements will be executed according to the sortOrder, where {field_name} may be substituted by its value as a BigDecimal and {"field_name"} may be substituted by its value as a String. In this example, whatever is returned by Select statements may be added to the overall list of key/value pairs and may be available for use in subsequent SQL statements. For example, postMeetingNotes column returned in the Select statement may be used alter in the Update statement, where "nl" is a special character indicating a new line ("sp" indicates a space, and "tb" indicates a tab) and any concatenation (+) that appears inside the braces { } maybe performed in Java, for example.

It will be apparent to those skilled in the art that various modifications and variations can be made in the forms engine for a portable device in accordance with the present invention without departing from the spirit or scope of the invention. For example, while the above example includes a fillable, form-enabled data request, any message, whether needing a response or not from the user, may be displayed in the form-enabled screen without departing from the scope of the invention. Thus, it is intended that the present invention cover the modifications and variations of this invention provided they come within the scope of the appended claims and their equivalents.

What is claimed is:

1. A system, comprising:
    a database; and
    a server,
    the server including a messaging module that generates a destination email message, the destination email message having attached thereto a form script file, the messaging module sending the destination email message over a communications network to a portable device, wherein within the destination email message the form script file includes a response email address and includes definitions of a form interface to be used by the portable device to render the form interface,
    wherein the database includes a record for the form script file,
    wherein the record includes user-submitted data collected from a response email message received from the portable device using the response email address in the form script file in response to the generated destination email message from the messaging module;
    wherein the server is configured to parse the user-submitted data collected from a response email message and store each user-submitted data field individually in the database.

2. The system of claim 1, wherein the record is identified by a form ID.

3. The system of claim 1, wherein the form script file is in extensible markup language (XML).

4. The system of claim 1 further comprising one or more application servers that generate an email-generating event, wherein the form script file is based on the email-generating event.

5. The system of claim 1, wherein the user-submitted data are included in the payload of the response email message.

6. The system of claim 1, wherein the response email message is a text based attachment-less email message.

7. A method, comprising the steps of:
    creating a destination email message including a form script file, wherein within the destination email message, the form script file includes a response email address and definitions of a form interface to be used by a portable device to render the form interface;

creating a record in a database for the form script file;
attaching the form script file to the destination email message;
transmitting the destination email message to the portable device through a communications network;
receiving a response email message from the portable device using the response email address in the form script file in response to the email message;
parsing through the response email message to collect user-submitted data associated with the form script file; and
storing the collected user-submitted data individually in the record for the form script file.

8. The method of claim 7 further comprising the step of detecting an email-generating event, wherein the form script file is created based on the email-generating event.

9. The method of claim 7, wherein the form script file is in extensible markup language (XML).

10. The method of claim 7 further comprising the steps of:
generating a form ID associated with the form script file; and
storing the form ID in the record for the form script file.

11. The method of claim 7, further comprising the steps of:
detecting a form ID in the response email message; and
verifying whether a record exists in the database that matches the detected form ID in the response email message.

12. A portable device, comprising:
a display;
an email application module;
an interface module to render an email interface on the display; and
a forms engine to detect a destination email message received by the email application unit containing a form script file, and to cause the interface module to render a form interface based on the form script file, the form script file including definitions of the form interface,
wherein within the destination email message, the form script file includes a response email address, and
wherein the forms engine transforms the user-submitted data entered into the form interface into a response email message to be transmitted by the email application module to the response email address included in the form script file.

13. The portable device of claim 12 further including an input unit in communication with the interface module to enter data into the form interface.

14. The portable device of claim 12, wherein the forms engine parses through the entered data to collect key/value pairs of the data entered into the form interface.

15. The portable device of claim 12, wherein the response email message is in a predetermined format to be parsed and entered into a database.

16. The method of claim 12, wherein the form script file is in extensible markup language (XML).

17. A method, comprising the steps of:
receiving a destination email message with an attachment using a portable device;
determining if the attachment is a form script file;
if the attachment is not a form script file, then processing the destination email message as a regular destination email message, and if the attachment is a form script file, then processing the form script file to render a form interface, the form script file including definitions of the form interface;
receiving user-submitted data into one or more fields in the form interface; and
transforming the received user-submitted data into a response email message to be transmitted to a response email address, wherein within the destination email message, the response email address is included in the form script file.

18. The method of claim 17, wherein the step of transforming includes parsing through the data to retrieve a key/value pair of each field.

19. The method of claim 17, wherein the response email message is in a predetermined format to be parsed and entered into a database.

20. The method of claim 17, wherein the form script file is in extensible markup language (XML).

21. A computer program product including a non-transitory computer readable medium having stored thereon computer executable instructions that, when executed by a computer, direct the computer to perform a method comprising the steps of:
creating a form script file including a response email address and including definitions of a form interface to be used by a portable device to render the form interface;
creating a record in a database for the form script file;
attaching the form script file to a destination email message;
transmitting the destination email message to the portable device through a communications network;
receiving a response email message from the portable device using the response email address, in response to the email message, wherein in the destination email message, the response email address is included in the form script file;
parsing through the response email message to collect user-submitted data associated with the form script file; and
storing the collected user-submitted data individually in the record for the form script file.

22. The computer program product of claim 21, wherein the computer executable instructions, when executed by the computer, direct the computer to perform the method further comprising the steps of detecting an email-generating event, wherein the form script file is created based on the email-generating event.

23. The computer program product of claim 21, wherein the form script file is in extensible markup language (XML).

24. The computer program product of claim 21, wherein the computer executable instructions, when executed by the computer, direct the computer to perform the method further comprising the steps of:
generating a form ID associated with the form script file; and
storing the form ID in the record for the form script file.

25. The computer program product of claim 21, wherein the computer executable instructions, when executed by the computer, direct the computer to perform the method further comprising the steps of:
detecting a form ID in the response email message; and
verifying whether a record exists in the database that matches the detected form ID in the response email message.

26. A computer program product including a non-transitory computer readable medium having stored thereon computer executable instructions that, when executed by a computer, direct the computer to perform a method comprising the steps of:
receiving a destination email message with an attachment, using a portable device;
determining if the attachment is a form script file;

if the attachment is not a form script file, then processing the destination email message as a regular destination email message, and if the attachment is a form script file, then processing the form script file to render a form interface, the form script file including definitions of the form interface, and wherein in the destination email message, the form script file including a response email address;

receiving user-submitted data into one or more fields in the form interface; and transforming the received user-submitted data into a response email message to be transmitted to the response email address included in the form script file.

27. The computer program product of claim 26, wherein the step of transforming includes parsing through the data to retrieve a key/value pair of each field.

28. The computer program product of claim 26, wherein the response email message is in a predetermined format to be parsed and entered into a database.

29. The computer program product of claim 26, wherein the form script file is in extensible markup language (XML).

* * * * *